United States Patent [19]

Bour et al.

[11] Patent Number: 5,133,409
[45] Date of Patent: Jul. 28, 1992

[54] FOAMED WELL CEMENTING COMPOSITIONS AND METHODS

[75] Inventors: Daniel L. Bour; Jerry D. Childs, both of Duncan, Okla.

[73] Assignee: Halliburton Company, Duncan, Okla.

[21] Appl. No.: 626,360

[22] Filed: Dec. 12, 1990

[51] Int. Cl.$^5$ ............... E21B 33/138; E21B 33/14
[52] U.S. Cl. ........................... 166/293; 106/678; 166/309
[58] Field of Search ............... 166/293, 309; 106/678, 106/725

[56] References Cited

U.S. PATENT DOCUMENTS

| | | | |
|---|---|---|---|
| 3,782,983 | 1/1974 | Komor | 106/725 X |
| 3,926,257 | 12/1975 | Marrast et al. | 166/293 |
| 4,046,582 | 9/1977 | Kawamura et al. | 106/678 X |
| 4,135,940 | 1/1979 | Peltier | 106/678 |
| 4,300,633 | 11/1981 | Stewart | 166/293 X |
| 4,340,427 | 7/1982 | Sutton | |
| 4,415,366 | 11/1983 | Copening | 166/293 X |
| 4,466,833 | 8/1984 | Spangle | 166/293 X |
| 4,565,578 | 1/1986 | Sutton et al. | |
| 4,618,370 | 10/1986 | Green et al. | 106/678 X |
| 4,791,989 | 12/1988 | Brothers et al. | 166/293 |
| 4,871,395 | 10/1989 | Sugama | 106/678 |

*Primary Examiner*—George A. Suchfield
*Attorney, Agent, or Firm*—Thomas R. Weaver

[57] ABSTRACT

Foamed well cementing compositions and methods of performing cementing operations in salt containing subterranean environments are provided. The compositions are comprised of hydraulic cement, salt water, dispersed gas and a foaming agent selected from the group consisting of surfactants of the formula $R-(OR'-)_n-OSO_3^- X^+$.

7 Claims, No Drawings

FOAMED WELL CEMENTING COMPOSITIONS AND METHODS

BACKGROUND OF THE INVENTION

1. Field of the Invention

The present invention relates to foamed well cementing compositions and methods, and more particularly, to such compositions and methods which are particularly suitable for use in salt containing subterranean environments.

2. Description of the Prior Art

In cementing operations performed in oil and gas wells, a hydraulic cement composition is pumped down the well bore penetrating a subterranean formation into contact with the formation and allowed to set therein. Such cementing operations generally involve either primary cementing or squeeze cementing. In performing a primary cementing operation, the cement composition is pumped through a conduit disposed in the well bore and back up through the annulus between the conduit and the earth formations forming the sides of the well bore. Upon setting, the cement composition bonds to the conduit and to the sides of the well bore whereby the conduit is rigidly supported within the well bore, and fluid movement in the annulus between the conduit and the sides of the well bore is prevented. In squeeze cementing operations, a hydraulic cement composition is pumped through the well bore into a particular subterranean formation or zone therein from which it is desired to stop the flow of undesirable fluids. Upon setting, the cement composition bonds to the formation whereby fluids are prevented from flowing therefrom into the well bore.

When the above described cementing operations are carried out in subterranean formations comprised of salt, i.e., alkali metal or alkaline earth metal salts, it has been found that good bonding between the salt formation and cement compositions is most often achieved when the cement compositions are formed with water containing salt, i.e., salt concentrations of from about 18% by weight of water to saturation. In addition, the salt functions in the cement compositions as a dispersant and can cause the cement compositions to expand upon setting whereby bonding and sealing are enhanced.

Foamed cement compositions have heretofore been used in performing oil and gas well cementing operations. Foamed cement compositions are advantageous in that they have low densities and low fluid loss properties. In addition, as described in U.S. Pat. No. 4,340,427 issued Jul. 20, 1982, foamed cement compositions have an increased compressibility as compared to non-foamed cement compositions. The increased compressibility helps prevent the incursion of pressurized formation gas into and around the cement composition prior to when it sets.

While heretofore used foamed cement compositions have included various foam stabilizers for preventing the compositions from prematurely separating into their slurry and gas components, when the water utilized contains high salt concentrations (typically above about 18%), the times required for the cement compositions to set are extended. In addition, the use of conventional foam stabilizers in foamed salt water cement compositions disadvantageously extend the set times even further. However, cement compositions which are formed with salt water have been found to be particularly suitable for carrying out cementing operations in subterranean well formations comprised or partially comprised of salt. That is, salt containing cement compositions form a stronger bond to salt containing formations than do fresh water cement compositions. Thus, salt water cement compositions, and particularly light weight foamed salt water cement compositions, are useful in performing cementing operations in salt containing subterranean formations, but the long set times of such cement compositions has heretofore been disadvantageous.

By the present invention, improved foamed cement compositions for performing cementing operations in salt containing subterranean formation environments and methods of performing cementing operations using the compositions are provided.

SUMMARY OF THE INVENTION

Foamed cement compositions for performing well cementing operations in salt containing subterranean formation environments and methods of using such cement compositions are provided. The compositions are basically comprised of hydraulic cement; sufficient water to form a pumpable slurry; a foaming agent selected from the group consisting of surfactants of the formula

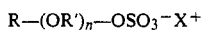

$$R-(OR')_n-OSO_3^- X^+$$

wherein

X is any compatible cation,

R is an alkyl radical having from 1 to 50 carbon atoms, a cycloalkyl radical having from 5 to 6 carbon atoms, a cycloalkyl radical having from 5 to 6 carbon atoms substituted with an alkyl radical having from 1 to 4 carbon atoms, a phenyl radical substituted with from 1 to 3 alkyl radicals independently having from 1 to 18 carbon atoms, or an alkyl radical having from 1 to 18 carbon atoms substituted with a phenyl radical or substituted with a phenyl radical which is itself substituted with an alkyl radical having from 1 to 18 carbon atoms with the total number of carbon atoms being in the range of from 8 to 28, R' is a substituted ethylene group of the formula —CH$_2$—CH(R'') where R'' is independently hydrogen, methyl or ethyl, n is an integer from 0 to 40 provided that when R is a phenyl radical or an alkyl substituted phenyl radical, n is at least 1; and sufficient gas dispersed in the slurry to form a foam. The foaming agent is generally present in the compositions in an amount in the range of from about 0.25% to about 6.0% by weight of water therein.

A preferred composition of this invention is comprised of Portland Cement; water containing one or more salts present in the composition in an amount in the range of from about 38% to about 80% by weight of dry cement therein; nitrogen gas or air dispersed in the composition in an amount in the range of from about 10% to about 75% by volume of the composition; the above described foaming agent present in the composition in an amount in the range of from about 0.25% to about 6.0% by weight of water therein; and a foam stabilizer which, depending upon the temperature to which the cement composition will be subjected, is either a compound of the formula

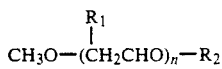

(below about 130° F.) wherein $R_1$ and $R_2$ are independently hydrogen or a methyl radical and n is an integer from 20 to 200 or a compound of the formula R—CONHCH$_2$CH$_2$CH$_2$+N(CH$_3$)$_2$CH$_2$CO$_2$− (above about 130° F.) wherein R is a radical selected from decyl, cetyl, oleyl, lauryl or coco, the foam stabilizer being present in the composition in an amount in the range of from about 0.25% to about 3.0% by weight of water therein.

The methods of the invention comprise the steps of forming a foamed cement composition, introducing the cement composition into a subterranean formation to be cemented by way of the well bore penetrating it and allowing the composition to set into a hard mass therein.

It is, therefore, a general object of the present invention to provide foamed cementing compositions for performing well cementing operations in salt containing subterranean formation environments and methods of using such compositions.

Other and further objects, features and advantages of the present invention will be readily apparent to those skilled in the art upon a reading of the description of preferred embodiments which follows.

DESCRIPTION OF PREFERRED EMBODIMENTS

The foamed cement compositions of the present invention are particularly suitable for carrying out oil and gas well cementing operations in salt containing subterranean formation environments. The terms "salt containing subterranean formation environment(s)" and "salt containing environment in a subterranean formation" are used herein to mean either that the foamed cement composition contains salt or the subterranean formation to be cemented is formed or partially formed of salt, or both. The compositions are relatively quick setting and provide excellent bonding to salt containing formation materials. The term "salt" is used herein to mean alkali metal and alkaline earth metal salts such as sodium chloride, potassium chloride, carnallite (KCl·MgCl$_2$·6H$_2$O), bischofite (MgCl$_2$·6H$_2$O) and tachyhydite (CaCl$_2$·2MgCl$_2$·10H$_2$O). The foamed cement compositions are comprised of hydraulic cement, sufficient water to form a pumpable slurry, a foaming agent, and sufficient gas dispersed in the slurry to form a foam of desired density. Once the compositions have been placed in salt containing subterranean formations to be cemented, they rapidly thicken and set into hard masses having required strengths and other characteristics.

While various hydraulic cements can be utilized in forming the compositions of this invention, Portland Cement of the various types identified as API Classes A through H and J are preferred. Such cements are defined in *API Specification For Materials and Testing for Well Cements*, API Specification 10, Third Edition, Jul. 1, 1986 of the American Petroleum Institute which is incorporated herein by reference.

The water in the cement compositions can be fresh water having one or more salts dissolved therein, brine or sea water. The water can have a high concentration of one or more alkali metal or alkaline earth metal salts therein in an amount in the range of from about 18% by weight of the water to saturation of the water. The high concentration of salt in the water can be achieved by combining one or more salts with the hydraulic cement used. The most preferred salt is sodium chloride.

When the cement composition is to be pumped through a salt containing subterranean formation before being placed in a salt containing zone to be cemented, fresh water can be used for forming the cement composition. Salt from the subterranean formation is dissolved in the water as it flows through the formation whereby when placed, the composition contains salt. The foaming agent in the composition prevents the formation salt from destabilizing the foam.

The water utilized is included in the cement composition in an amount sufficient to form a pumpable slurry. Generally, the water is present in the composition in an amount in the range of from about 38% to about 80% by weight of dry cement therein.

The gas which is dispersed in the slurry is preferably selected from the group consisting of nitrogen and air. Depending upon the desired final density, the gas is dispersed in the slurry in an amount in the range of from about 10% to about 75% by volume of the resulting foamed cement composition.

As mentioned above, a foaming agent is included in the cement composition to facilitate foaming and to stabilize the foamed cement composition. In accordance with this invention, the foaming agent is a surfactant having the following formula:

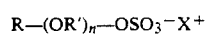

wherein:

X is any compatible cation;

R is an alkyl radical having from 1 to 50 carbon atoms, a cycloalkyl radical having from 5 to 6 carbon atoms, a cycloalkyl radical having from 5 to 6 carbon atoms substituted with an alkyl radical having from 1 to 4 carbon atoms, a phenyl radical substituted with from 1 to 3 alkyl radicals independently having from 1 to 18 carbon atoms, or an alkyl radical having from 1 to 18 carbon atoms substituted with a phenyl radical or substituted with a phenyl radical which is itself substituted with an alkyl radical having from 1 to 18 carbon atoms with the total number of carbon atoms being in the range of from 8 to 28;

R' is a substituted ethylene group of the formula —CH$_2$—CH(R") where R" is independently hydrogen, methyl or ethyl; and n is an integer from 0 to 40 provided that when R is a phenyl radical or an alkyl substituted phenyl radical, n is at least 1.

Preferably, the foaming agent is a surfactant having the formula:

wherein:

d is an integer in the range of from 5 to 15;

e is an integer in the range of from 1 to 10; and

X is any compatible cation.

A particularly preferred foaming agent is a surfactant having the formula:

wherein f is an integer in the range from 6 to 10. This surfactant is commercially available from the Witco Chemical Company of New York, N.Y., under the trade name Witcolate 7093.

Another particularly preferred foaming agent is a surfactant having the formula:

$$H(CH_2)_f(OC_2H_4)_3OSO_3^-(CH_3)_2CH^+NH_3$$

wherein f is as defined above. This surfactant is available from the Witco Chemical Company under the trade name Witcolate 1259.

The foaming agent is included in the cement composition in an amount in the range of from about 0.25% to about 6.0% by weight of water utilized. When the foaming agent is one of the particularly preferred surfactants described above, it is preferably included in the composition in an amount in the range of from about 1.5% to about 3.0% by weight of water.

A foam stabilizer can also be included in the foamed cement compositions of this invention to facilitate the dispersion of the gas in the slurry and to enhance the stability of the resulting foamed composition. When the temperature to which the cement composition will be subjected is below about 130° F, the foam stabilizer is preferably a compound of the formula:

$$CH_3O-(CH_2CHO)_n-R_2$$
$$\quad\quad\quad\quad\;\;|$$
$$\quad\quad\quad\quad\;\;R_1$$

wherein:
$R_1$ is hydrogen or a methyl radical;
$R_2$ is hydrogen or a methyl radical; and
n is an integer in the range of from 20 to 200.

A particularly preferred foam stabilizer of the above type is a methoxypolyethylene glycol of the formula:

$$CH_3O-(CH_2CH_2O)_nH$$

wherein n is in the range of from 100 to 150. This foam stabilizer is commercially available from Nalco Chemical Company of Sugarland, Tx., under the trade designation 9FP-151.

When the temperature to which the cement composition will be subjected is above about 130° F., the foam stabilizer is preferably a compound having the formula $$R-CONHCH_2CH_2CH_2^+N(CH_3)_2CH_2CO_2^-$$

wherein:
R is a decyl radical, a cetyl radical, an oleyl radical, a lauryl radical or a coco ($\sim C_{6-18}H_{13-37}$) radical.

A particularly preferred foam stabilizer of the above type is an amidopropylbetaine of the formula:

$$R-CONHCH_2CH_2CH_2^+N(CH_3)_2CH_2CO_2$$

wherein R is a coco ($\sim C_{6-18}H_{13-37}$) radical. This foam stabilizer is commercially available from PTG/Mazer under the tradename MAFO.

The foam stabilizer is preferably present in the cement composition in an amount in the range of from about 0.25% to about 3% by weight of water utilized. When the foam stabilizer is one of the particularly preferred foam stabilizers described above, it is preferably present in the composition in an amount in the range of from about 0.5% to about 1% by weight of water.

The most preferred foamed cement composition of the present invention is comprised of Portland Cement, salt, and water present in an amount in the range of from about 38% to about 80% by weight of dry cement, a foaming agent selected from the group consisting of a surfactant having the formula $H(CH_2)_f(OC_2H_4)_3OSO_3^-Na^+$ or $H(CH_2)_f(OC_2H_4)_3OSO_3^-(CH_3)_2CH^+NH_3$ wherein f is an integer in the range of from 6 to 10 present in an amount in the range of from about 1.5% to about 3.0% by weight of water, a foam stabilizer selected from the group consisting of a methoxypolyethylene glycol having the formula $CH_3O-(CH_2CH_2O)_nH$ wherein n is in the range of from 100 to 150 and an amidopropylbetaine of the formula $R-CONHCH_2CH_2CH_2^+N(CH_3)_2CH_2CO_2^-$ wherein R is a coco radical present in an amount in the range of from about 0.5% to about 1.0% by weight of water, and nitrogen dispersed in the slurry in an amount in the range of from about 10% to about 75% by volume of the resulting cement composition.

As will be understood by those skilled in the art, the foamed cement compositions of this invention can include a variety of other conventional additives for achieving desired results.

In forming the foamed cement compositions of this invention, the cement, salt and other dry additives used are preferably first blended together followed by mixing with the water used to form a slurry. As the slurry is pumped to the well bore, the foaming agent and foam stabilizer (if used) followed by the nitrogen or air are preferably injected into the slurry on the fly. As the slurry and gas flow to the formation, the cement composition is foamed and stabilized.

The methods of this invention for performing cementing operations in salt containing subterranean environments comprise the steps of forming a foamed cement composition of the type described above, introducing the cement composition into a subterranean formation or zone therein to be cemented by way of the well bore penetrating the formation, and allowing the cement composition to set into a hard mass in the formation.

A presently preferred method comprises the steps of forming a foamed cement composition comprised of hydraulic cement, sufficient water to form a pumpable slurry, a foaming agent of the type described above present in an amount in the range of from about 0.25% to about 6.0% by weight of water, and sufficient gas dispersed in the slurry to form a foam; introducing the cement composition into the subterranean formation to be cemented; and allowing the cement composition to set into a hard mass in the formation.

The most preferred method of performing a cementing operation in a salt containing subterranean formation penetrated by a well bore comprises the steps of forming a foamed cement composition comprised of Portland Cement, salt water present in an amount in the range of from about 38% to about 80% by weight of dry cement, a foaming agent selected from the group consisting of a surfactant having the formula $H(CH_2)_f(OC_2H_4)_3OSO_3^-Na^+$ or $H(CH_2)_f(OC_2H_4)_3OSO_3^-(CH_3)_2CH^+NH_3$ wherein f is an integer in the range of from 6 to 10 present in an amount in the range of from about 1.5% to about 3.0% by weight of water, a foam stabilizer selected from the group consisting of a methoxypolyethylene glycol having the formula $CH_3O-(CH_2CH_2O)_nH$ wherein n is in the range of from 100 to 150 and an amidopropylbetaine of the formula $R-CONHCH_2CH_2CH_2^+N(CH_3)_2CH_2CO_2^-$ wherein R is a coco radical present in an amount in the range of from about 0.5% to about 1.0% by weight of water, and nitrogen dispersed in the slurry in an amount in the range of from about 10% to about 75% by volume of the resulting cement composition; pumping the foamed cement composition into the formation by way of the well bore; and allowing the foamed cement composition to set into a hard mass in the formation.

In order to further illustrate the compositions and methods of the present invention, the following examples are given.

EXAMPLE 1

Three test cement slurries were prepared by mixing API Class H cement with fresh water. Sodium chloride salt was included in two of the slurries, and the properties of the three slurries were determined. Witcolate 1259 foaming agent and a methoxypolyethylene glycol foam stabilizer were combined with each of the slurries. The amounts of the components in the slurries and the properties of the slurries are set forth in Table I below.

TABLE I

Test Slurries

| Component | Slurry No. 1 lbs./sk. | Slurry No. 1 % by wt. | Slurry No. 2 lbs./sk. | Slurry No. 2 % by wt. | Slurry No. 3 lbs./sk. | Slurry No. 3 % by wt. |
|---|---|---|---|---|---|---|
| API Class H Cement | 94 | 100 | 94 | 100 | 94 | 100 |
| Salt (NaCl) | 6.45 | $18.0^2$ | 13.33 | $37.2^2$ | — | — |
| Fresh Water | 35.8 | $38.1^3$ | 35.8 | $38.1^3$ | 35.0 | $38.1^3$ |
| Foaming Agent (Witcolate 1259) | 0.54 | $0.57^2$ | 0.54 | $0.57^2$ | 0.54 | $0.57^2$ |
| Foam Stabilizer (methoxypolyethylene glycol) | 0.27 | $0.29^2$ | 0.27 | $0.29^2$ | 0.27 | $0.29^2$ |

| | Slurry Properties[1] | | |
|---|---|---|---|
| Density (lb./gal.) | 16.8 | 16.7 | 16.4 |
| Yield (cu. ft./sk.) | 1.14 | 1.09 | 1.06 |
| Water (gal./sk.) | 4.3 | 4.3 | 4.3 |

[1]properties of unfoamed slurry without foaming agent and foam stabilizer
[2]% by weight of water
[3]% by weight of dry cement Appropriate quantities of the three slurries described above were placed in a stacked-blade foaming cup and sheared whereby air was dispersed therein and stabilized foams having densities of 11 lbs. per gallon were formed. The times required for forming the stabilized foams utilizing Slurries Nos. 1 and 2 are set forth in Table II below.

TABLE II

Foaming Tests

| Slurry Used | Foamed Slurry Density (lb./gal.) | Time to obtain stable foamed slurry, secs. |
|---|---|---|
| Slurry No. 1 | 11.0 | 5–10 |
| Slurry No. 2 | 11.0 | 60+ |

From Table II it can be seen that the saturated salt water slurry was more difficult to foam than the 18% by weight salt water slurry. However, both slurries produced stabilized foamed cement compositions.

EXAMPLE 2

The saturated salt water slurry (Slurry No. 2) was tested for thickening time, initial set time, time to reach a compressive strength of 500 psi, and compressive strength after approximately 18½ hours in accordance with standard test procedures. An identical slurry, but excluding the foam stabilizers, was also tested in the same manner for comparison purposes. The results of these tests are set forth in Table III below.

TABLE III

Thickening Time and Compressive Strength Tests

| Slurry Used | Thickening Time,[1] hrs.:mins. | Initial Set, hrs.:mins. | Time to reach compressive strength of 500 psi., hrs.:mins. | Compressive strength[2] at time, psi. @ hrs.:mins. |
|---|---|---|---|---|
| Slurry No. 2 | 3:04 | 3:26 | 6:06 | 1723 @ 18:38 |
| Slurry No. 2 without foam stabilizers | 2:53 | 3:00 | 5:09 | 1760 @ 18:40 |

[1]Conducted at 144° F. and 7500 psig.
[2]Conducted at 144° F. and 3000 psig.

From Table III it can be seen that the foam stabilizers utilized in accordance with the present invention do not materially delay the thickening and set times of a saturated salt water cement composition or diminish the compressive strength thereof.

EXAMPLE 3

Samples of the three slurries described in Example 1 were foamed with air in a stacked-blade foaming cup to a density of about 11 lbs. per gallon, and tested for quality of bonding to sodium chloride salt formation core samples and sodium chloride salt blocks. The foamed slurry samples were poured around or into holes formed in the salt cores and blocks and were cured at room temperature either exposed to the atmosphere (dry) or under saturated salt water caps (wet). The qualities of the bonds between the cured foamed cement samples and the salt blocks and cores were then determined. The results of these tests are given in Table IV below.

TABLE IV

Foamed Slurry/Salt Bonding Tests

| Slurry Used | Type of Salt Sample | Curing Environment | Bond Quality |
|---|---|---|---|
| Slurry No. 1 | Block | Wet[1] | Good |
| Slurry No. 2 | Block | Wet[1] | Good |
| Slurry No. 1 | Block | Dry[2] | Fair |
| Slurry No. 2 | Block | Dry[2] | Good |
| Slurry No. 1 | Core | Dry[2] | Good |
| Slurry No. 2 | Core | Dry[2] | Good |
| Slurry No. 3 | Core | Dry[2] | Poor |
| Slurry No. 1 | Core | Wet[1] | Good |
| Slurry No. 2 | Core | Wet[1] | Good |
| Slurry No. 3 | Core | Wet[1] | No Bond |

[1]Cured with salt water cap
[2]Cured exposed to atmosphere

From Table IV it can be seen that foamed fresh water cement compositions do not bond as well to salt block and salt core samples in wet and dry environments. However, the foamed salt water cement compositions of the present invention achieve good bonds to both salt blocks and cores under both wet and dry conditions.

The present invention is, therefore, well adapted to carry out the objects and achieve the ends and advantages mentioned as well as those inherent therein. While numerous changes in the particular components and steps of the present invention may be made by those skilled in the art, such changes are encompassed within the spirit of this invention as defined by the appended claims.

What is claimed is:

1. A method of cementing a well penetrating a salt containing subterranean formation comprising:

forming a foamed cement composition;

placing said foamed cement composition in contact with said salt containing formation; and permitting said foamed cement composition to set in contact with said salt containing formation to form a hardened mass of cement;

wherein said cement composition consists essentially of Portland cement, sufficient water to form a pumpable slurry, sodium chloride present in said water in an amount in the range of from about 18% by weight of water to saturation, sufficient gas dispersed in said slurry to produce a foam, a foaming agent present in said composition in an amount in the range of from about 0.25% to about 6.0% foaming agent by weight of water in said composition and a foam stabilizer present in said composition in an amount in the range of from about 0.25% to about 3.0% stabilizer by weight of water;

said foaming agent is selected from compounds having the general formulae

and

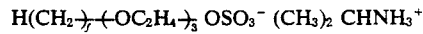

wherein f is an integer in the range of from 6 to 10, and said foam stabilizer is selected from compounds having the general formulae

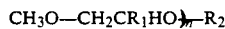

and

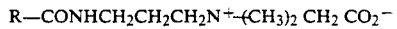

wherein $R_1$ and $R_2$ are independently hydrogen or a methyl radical, n is an integer from 20 to 200 and R is a radical selected from decyl, cetyl, oleyl, lauryl and coco.

2. The method of claim 1 wherein said water is present in said cement composition in an amount in the range of from about 38% to about 80% by weight of dry cement.

3. The method of claim 2 wherein said gas is present in said composition in an amount in the range of from about 10% to about 70% by volume of said composition and is selected from the group consisting of nitrogen and air.

4. The method of claim 3 wherein said foam stabilizer is selected from the group consisting of a methoxypolyethylene glycol having the formula

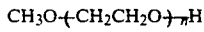

and an amidopropylbetaine having the formula

wherein n is in the range of from 100 to 150 and R is a coco radical.

5. The method of claim 4 wherein said foam stabilizer is present in said composition in an amount in the range of from about 0.5% to about 1% by weight of said water and said foaming agent is present in said composition in an amount in the range of from about 1.5% to about 3.0% by weight of said water.

6. The method of claim 4 wherein said foaming agent is said compound having the formula

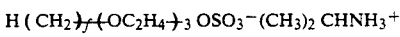

wherein f is an integer in the range of from 6 to 10.

7. The method of claim 6 wherein said stabilizer is said methoxypolyethylene glycol.

* * * * *